United States Patent [19]

Mayo

[11] Patent Number: 4,578,987
[45] Date of Patent: Apr. 1, 1986

[54] TEST AND ISOLATION TOOL

[76] Inventor: John H. Mayo, 404 Alonda Dr., Lafayette, La. 70503

[21] Appl. No.: 619,921

[22] Filed: Jun. 12, 1984

[51] Int. Cl.⁴ .............................................. G01M 3/28
[52] U.S. Cl. .................................. 73/40.5 R; 73/49.1
[58] Field of Search ................. 73/40.5 R, 49.1, 49.6, 73/46, 49.5, 49.8

[56] References Cited

U.S. PATENT DOCUMENTS

| | | | |
|---|---|---|---|
| 3,165,919 | 1/1965 | Loomis | 73/40.5 R |
| 3,420,095 | 1/1969 | Brown et al. | 73/49.1 |
| 3,503,249 | 3/1970 | Dumond | 73/49.1 |
| 4,152,924 | 5/1979 | Mayo | 73/40.5 R |
| 4,373,380 | 2/1983 | Mayo | 73/40.5 R |

Primary Examiner—Stewart J. Levy
Assistant Examiner—Hezron E. Williams
Attorney, Agent, or Firm—Kimmel, Crowell & Weaver

[57] ABSTRACT

A test and isolation tool for wells of expanded utility and reduced manufacturing cost is disclosed. The outside diameter of the tool is significantly reduced and its overall construction is simplified by total elimination of a previously-employed annular piston. In lieu thereof, the outer surface of a mandrel forms one wall of a cylinder chamber for interfitting axially displaceable seal energizing rings which operate as pistons. The interior surface of a skirt portion of one seal energizing ring forms the other wall of the cylinder chamber for the two rings.

4 Claims, 2 Drawing Figures

TEST AND ISOLATION TOOL

BACKGROUND OF THE INVENTION

A major objective of the present invention is to improve on the tool disclosed in U.S. Pat. No. 4,373,380, Mayo. In accordance with the present invention, the utility of the patented tool has been greatly expanded, while its structure has been considerably simplified and its manufacturing cost reduced.

These important improvement features result mainly from the fact that the outside diameter of the improved tool has been substantially reduced in comparison to the outside diameter of the patented tool. As a result of this diameter reduction, the improved tool is not limited in its usage to testing internal sealing surfaces of relatively large diameter well head housings. The improved tool can be used to test the integrity of relatively smaller diameter well casings and other sleeve members.

The casing, casing hanger and connecting joints immediately below the blow-out preventer (BOP) or well head can fail during well drilling operations. Such failures are responsible for a number of very costly blow-outs. The U.S. Minerals Management Service does not presently require testing of well components below the casing hanger, and heretofore this area of the well, as a practical matter, could not be tested. The present invention satisfies a need for a practical and economical test tool for the zone of a well below the casing hanger.

A further objective of the invention is to provide a multipurpose tool which can be used to isolate members of the well head, BOP and hanger assembly for testing.

In accordance with this invention, the improved tool has four main functions:

1. As an isolation tool, the unit can be run in 18¾", 16¾" and 13⅝" BOPs to determine leakage in these components.

2. The tool can test an intact sub-sea well head housing which has been used or repaired and will provide a graphic chart of the test as a permanent record in the manner disclosed in U.S. Pat. No. 4,373,380. This enables an operator to make a decision on scrapping or reconditioning a used well head housing so that the useful life of the same can be extended.

3. The tool according to the present invention can replace cup-type testers. Its seals are much more durable and will far outlast cup-type seals which are subject to damage as they are pulled from the well.

4. The improved tool serves as a key seat indicator tool. The relatively thin lips of metal containment rings for elastic seal elements indicate key seat wear present in well casings by bulging outwardly into key seat recesses under influence of fluid pressure. An operator observing this condition can reposition the drilling pipe or mobile rig before key seat wear in one location has become too great to tolerate.

Other features and advantages of the invention will become apparent to those skilled in the art during the course of the following detailed description.

DETAILED DESCRIPTION

Figure 1A:
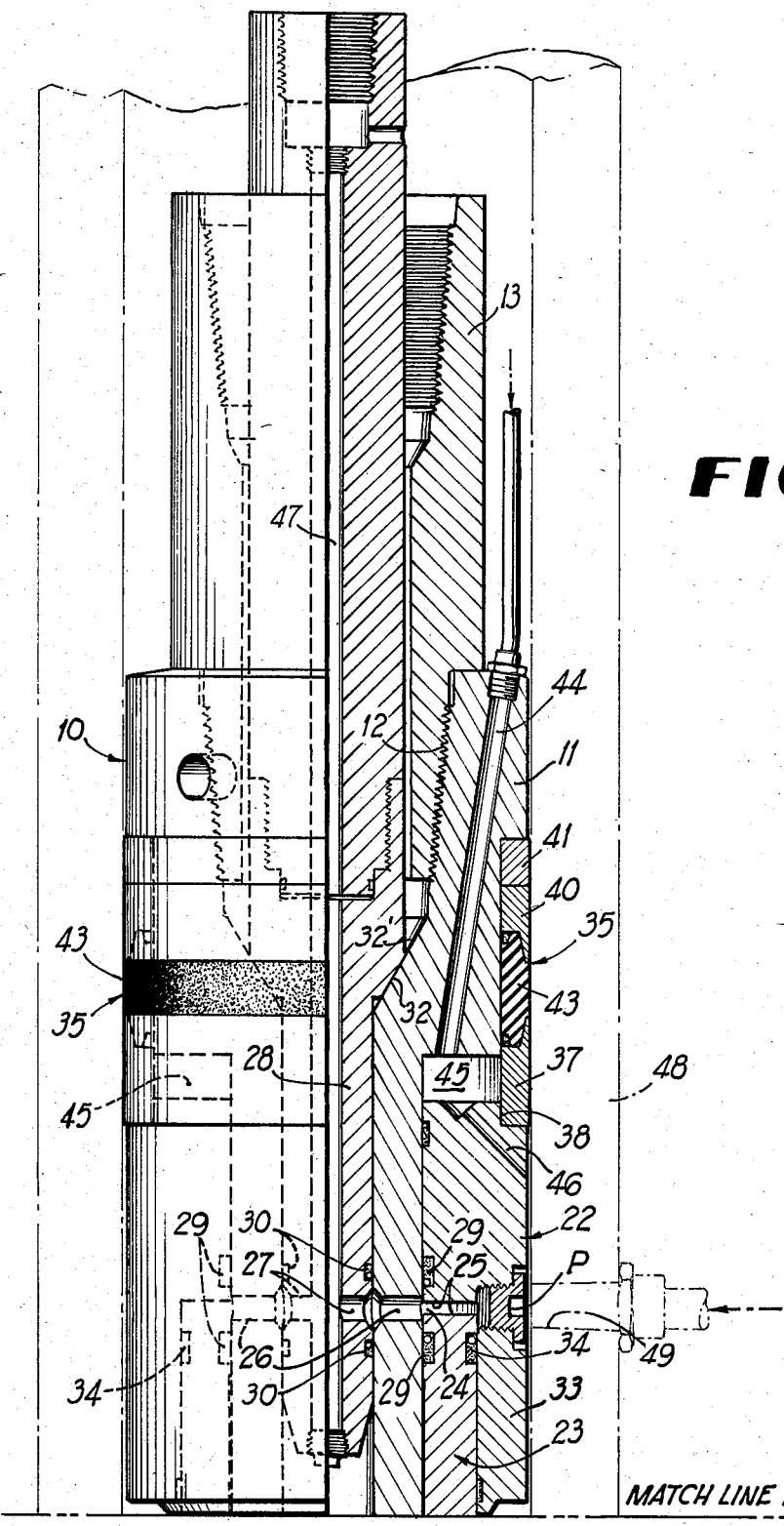
FIGS. 1A and 1B, when matched on match lines 1A and 1B, form a central vertical longitudinal section through a test and isolation tool for wells, partly in elevation.

Referring to the drawings in detail wherein like numerals designate like parts, a test and isolation tool for wells according to the present invention comprises a mandrel 10 which is cylindrical and tubular throughout most of its length. At its upper end, the mandrel includes an enlarged diameter head 11 which is internally screw-threaded as at 12 to receive thereon a Baker locked PUP 13. At its lower end, the mandrel 10 is externally threaded as shown at 14 to receive an internally threaded seal support 15, on which is threadedly mounted a deburring ring 16 secured in place by an anti-back-off screw 17 anchored in the seal support 15.

A threaded protector/guide 18 is also carried on the forward end portion of the seal support 15, as shown. The seal support 15 includes a shoulder 19 which is locked by screws 20 to the lower end face of mandrel 10. The seal support 15 is optionally internally threaded at its lower end, as indicated at 21, to receive a closure plug, when such plug is necessary.

Mounted on and surrounding the mandrel 10 between its enlarged head 11 and the seal support 15 are separate oppositely axially movable seal energizer rings 22 and 23. A space 24 between the two energizing rings 22 and 23 defining two opposing piston faces 25 is in communication with a radial port 26 formed through the wall of mandrel 10. This mandrel port 26 registers with a radial port 27 formed in a two-piece or one-piece dart 28 which extends upwardly to and beyond the PUP 13.

On opposite sides of the ports 26 and 27, the seal energizing rings 22 and 23 and mandrel 10 are sealed by "POLYPAK" seals 29. Similarly, the bore of mandrel 10 and the dart 28 therein are sealed by additional "POLYPAK" seals 30. Another such seal 31, FIG. 1B, seals the lower end of the mandrel with the lower seal support 15. When inclined faces 32 and 32' of the dart 28 and mandrel 10 are solidly engaged, the radial ports 26 and 27 are disposed in registration.

Figure 1B:
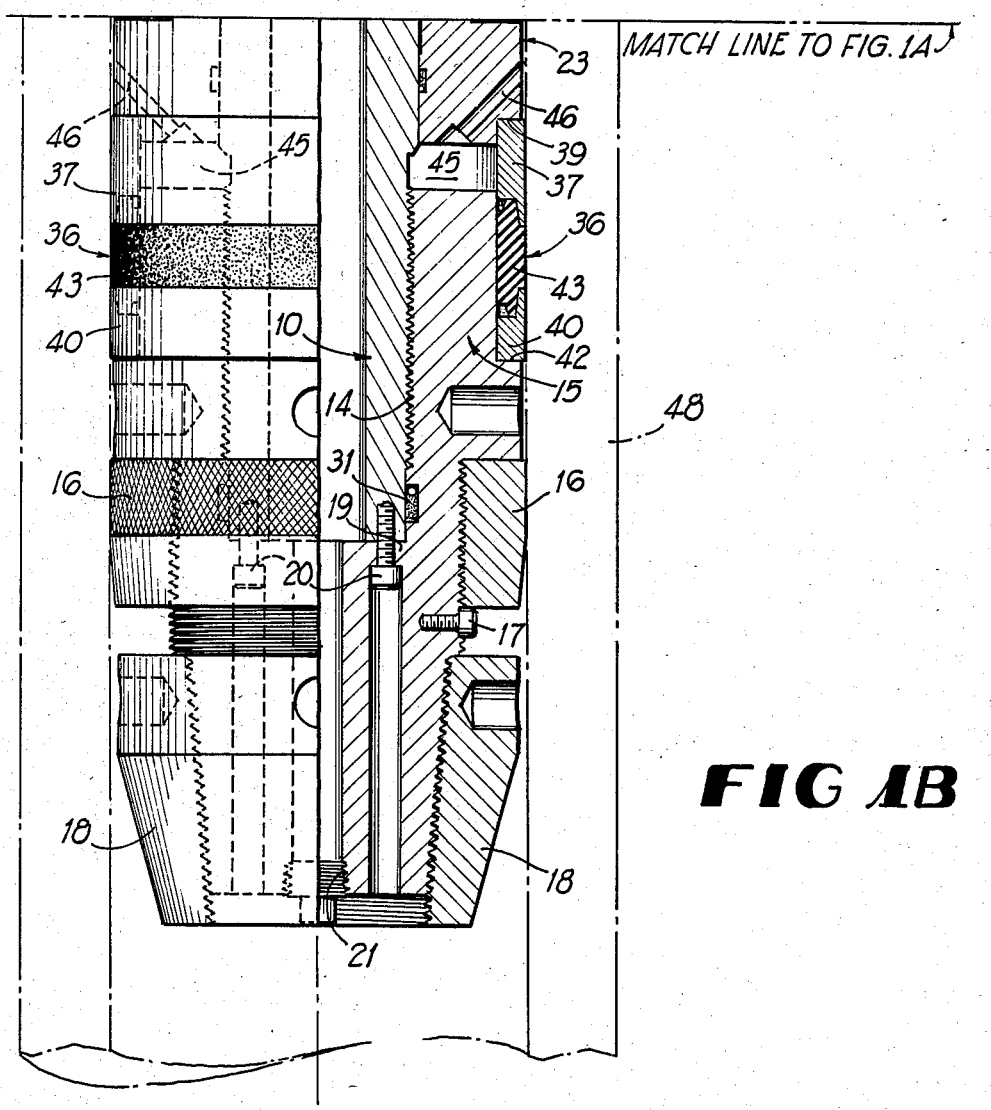

The seal energizing ring 22 includes an integral lower skirt portion 33 which overlaps the upper portion of the relatively movable seal energizing ring 23, FIG. 1A. These overlapping ring parts are sealed by another "POLYPAK" seal 34.

Upper and lower seal assemblies 35 and 36 of the same type shown in U.S. Pat. No. 4,373,380 surround the upper portion of mandrel 10 and the seal support 15. The metal seal containment rings 37 of the two seal assemblies enter annular seats 38 and 39 formed in the seal energizer rings 22 and 23, respectively. The other metal containment rings 40 of seal assemblies 35 and 36 surround the mandrel 10 and seal support 15 and have their ends engaging a guide ring 41 on the mandrel 10 and an annular shoulder 42 on the seal support 15, respectively. Elastic seal elements 43 of the two seal assemblies are secured to the containment rings 37 and 40 and function therewith in the manner described in U.S. Pat. No. 4,373,380.

A somewhat inclined test fluid port 44 is formed through the upper end portion of mandrel 10 and intersects an annular cylindrical chamber 45 within which the two interfitting seal energizing rings 22 and 23 operate like opposing pistons at proper times. Diagonal test fluid ports 46 lead from the chamber 45 through the exterior faces of rings 22 and 23 to deliver pressurized test fluid to the region between the two seal assemblies 35 and 36.

An important feature of the construction of the tool contributing to its small outside diameter resides in the utilization of the outer surface of the mandrel 10 as one wall of the cylinder chamber 45 while the interior surface of the skirt portion 33 forms the other wall of the cylinder chamber. The interfitting parts of seal energizing rings 22 and 23 function as opposing pistons which move axially apart and together within the chamber 45 as the elastic seal elements 43 are energized and relaxed.

Pressurized seal energizing fluid is delivered through the bore 47 of dart 28 and then through registering ports 27 and 26 to the space 24 between the opposing piston faces 25 of seal activating rings 22 and 23. The pressurized fluid acts simultaneously on the piston faces 25 to force the rings 22 and 23 apart axially, thereby compressing and energizing the elastic seals 43 so that the latter will effectively seal critical surfaces of the bore of a surrounding housing, casing or the like shown at 48.

After the seals 43 are fully energized, as described in U.S. Pat. No. 4,373,380, test fluid at a required test pressure is introduced through the port 44 and passes through ports 46 to the exterior of the tool between the seal assemblies 35 and 36 and the critical surfaces of the element 48 which are being tested. The pressure test procedure and results being fully described in U.S. Pat. No. 4,373,380 need not be repeated herein in greater detail to enable a full understanding of the invention.

An optional feature not specifically shown in the prior patent is the inclusion of pressure gages on the two lines 92 and 93 in the patent. These gages, when employed, are connected by two hoses with the lines 85 and 86 near the two separator units 87 in the prior patent.

It can be seen that the comparative simplicity and compactness of the test and isolation tool according to the present invention allows its use in well casings, pipes and the like which heretofore could not be tested because of the larger diameter of the prior art tool.

In accordance with a further important capability of the improved tool, the test fluid port 44 and communicating ports 46 could be eliminated entirely or, if present, need not be used to deliver test fluid. Instead, the pressurized test fluid can be delivered through a radial port 49 in the surrounding tubular member 48 into the area between the seal assemblies 35 and 36. With this arrangement, the test tool itself may have its seals tested on a job site prior to running the tool into a well.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A test and isolation tool for wells comprising a mandrel including an upper enlarged head, a seal support on the mandrel near its lower end, an upper radially expandable elastic seal assembly including an elastic ring seal on said enlarged head of the mandrel, a lower radially expandable elastic seal assembly including an elastic ring seal on said seal support and being spaced coaxially from the upper seal assembly, an upper seal energizing ring on and surrounding the mandrel below said enlarged head and having a depending annular skirt spaced radially outwardly from the mandrel, a lower seal energizing ring on and surrounding the mandrel above said seal support and having an upwardly extending annular skirt disposed radially inwardly or the depending skirt and between the latter and the exterior surface of the mandrel, said upper and lower seal energizing rings having annular seats formed thereon at their respective upper and lower ends and said seats engaging the upper and lower seal assemblies, said upper and lower seal energizing rings having spaced opposing piston faces, means to deliver pressurized seal energizing fluid to the space between said piston faces, and means to deliver pressurized test fluid to the exterior of the tool between said upper and lower seal assemblies.

2. A test and isolation tool for wells as defined in claim 1, and said means to deliver pressurized seal energizing fluid comprising a dart extending into said mandrel and having a radial fluid delivery port near its lower end, said mandrel having a radial port in registration with the port of said dart, and the port of said mandrel communicating with the space between said piston faces.

3. A test and isolation tool for wells as defined in claim 2, and ring seals on the dart and mandrel on opposite sides of said ports and said space.

4. A test and isolation tool for wells comprising a mandrel having a comparatively small diameter elongated body portion and an upper enlarged head provided with seal seating surfaces, a seal support detachably coupled with the body portion of the mandrel near the lower end of the mandrel and provided with seal seating surfaces, upper and lower seal assemblies each including an elastic ring seal and a pair of seal containment rings, said seal assemblies having the same diameters and engaging said seal seating surfaces of the upper enlarged head and said seal support, an upper seal energizing ring on and surrounding the body portion of said mandrel below said upper enlarged head and having an upper seating shoulder formed thereon engaging the upper seal assembly and having a depending annular skirt surrounding and spaced radially from the body portion of said mandrel, said depending skirt having a lower end face spaced above the lower seal assembly, the exterior surface of the depending skirt having a diameter substantially equal to the outside diameters of the seal assemblies, a lower seal energizing ring on and surrounding the body portion of the mandrel above said seal support and having a lower seating shoulder formed thereon engaging the lower seal assembly and having an upstanding annular skirt disposed radially inwardly of the depending skirt and between the latter and the exterior surface of the mandrel body portion, the lower seal energizing ring having an annular radial shoulder projecting radially outwardly from said upstanding skirt and being in opposing relationship to said lower end face of said depending skirt, said upper and lower seal energizing rings having spaced opposing annular piston faces at their respective lower and upper ends, and means to deliver pressurized seal energizing fluid to the space between said piston faces.

* * * * *